(12) United States Patent
Baccouche et al.

(10) Patent No.: US 6,367,869 B1
(45) Date of Patent: Apr. 9, 2002

(54) ENERGY MANAGEMENT SYSTEM AND METHOD FOR AN EXTRUDED ALUMINUM VEHICLE SUBFRAME

(75) Inventors: Mohamed Ridha Baccouche, Ann Arbor; Hikmat F. Mahmood, Bloomfield Hills; Joseph C. Weishaar, Plymouth, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/625,436

(22) Filed: Jul. 26, 2000

(51) Int. Cl.$^7$ .................. B62D 21/00; B62D 21/15; B60R 19/24
(52) U.S. Cl. .................. 296/189; 296/204; 280/784
(58) Field of Search .................. 296/188, 189, 296/204; 280/784; 188/371, 376, 377

(56) References Cited

U.S. PATENT DOCUMENTS

| | | | |
|---|---|---|---|
| 3,171,669 A | | 3/1965 | Barenyi |
| 4,266,792 A | * | 5/1981 | Sanders et al. .............. 296/204 |
| 4,440,435 A | * | 4/1984 | Norlin .......................... 296/188 |
| 4,781,398 A | * | 11/1988 | Uebelstadt et al. ......... 280/784 |
| 5,085,485 A | | 2/1992 | Wurl |
| 5,454,453 A | * | 10/1995 | Meyer et al. ................ 280/784 |
| 5,472,259 A | * | 12/1995 | Akiyama et al. ........... 296/204 |
| 5,503,431 A | * | 4/1996 | Yamamoto ................... 188/376 |
| 5,558,369 A | * | 9/1996 | Cornea et al. .............. 296/204 |
| 5,564,745 A | * | 10/1996 | Morin, Jr. .................... 280/784 |
| 5,597,198 A | | 1/1997 | Takanishi |
| 5,605,353 A | * | 2/1997 | Moss et al. ................. 296/189 |
| 5,775,172 A | * | 7/1998 | Fevre et al. ................. 188/371 |
| 5,884,963 A | * | 3/1999 | Esposito et al. ............. 296/189 |
| 6,022,057 A | | 2/2000 | Vermeulen |
| 6,029,765 A | * | 2/2000 | Chou et al. .................. 280/784 |
| 6,099,039 A | * | 8/2000 | Hine ............................. 296/204 |
| 6,109,654 A | * | 8/2000 | Yamamoto et al. ......... 280/784 |

* cited by examiner

*Primary Examiner*—Joseph D. Pape
*Assistant Examiner*—Hilary Gutman
(74) *Attorney, Agent, or Firm*—Gregory P. Brown

(57) ABSTRACT

An energy management system and method for absorbing and directing kinetic energy during an impact event of a motor vehicle includes a vehicle subframe 30 attached to a vehicle chassis 20, with a pair of deformable attachment brackets 40 and 42 interposed therebetween. The deformable attachment brackets 40 and 42 are preferably fixedly attached to the subframe 30 and removably attached to the vehicle chassis 20 via fasteners 50 extending through a fastener hole 52 in each of the attachment brackets 40 and 42. A relief opening 54 is proximate to and aligned with the fastener hole 52, the relief opening 54 being larger than the fastener 50. A deformable barrier 56 disposed between the fastener hole 52 and relief opening 54 may be provided with a slot 58 extending between the fastener hole 52 and relief opening 54. Upon an impact generating an impact force above a predetermined force, the fastener 50 deforms the deformable barrier 56, whereby the deformable attachment bracket 40 and 42 is displaced longitudinally such that the fastener 50 is relocated from the fastener hole 52 into the relief opening 54. The fastener 50 slides out of the relief opening 54 and the subframe 30 drops beneath the vehicle chassis 20, whereby the subframe 30 translates longitudinally relative the vehicle chassis 20 during the crash event, safely away from the vehicle occupant compartment.

17 Claims, 2 Drawing Sheets

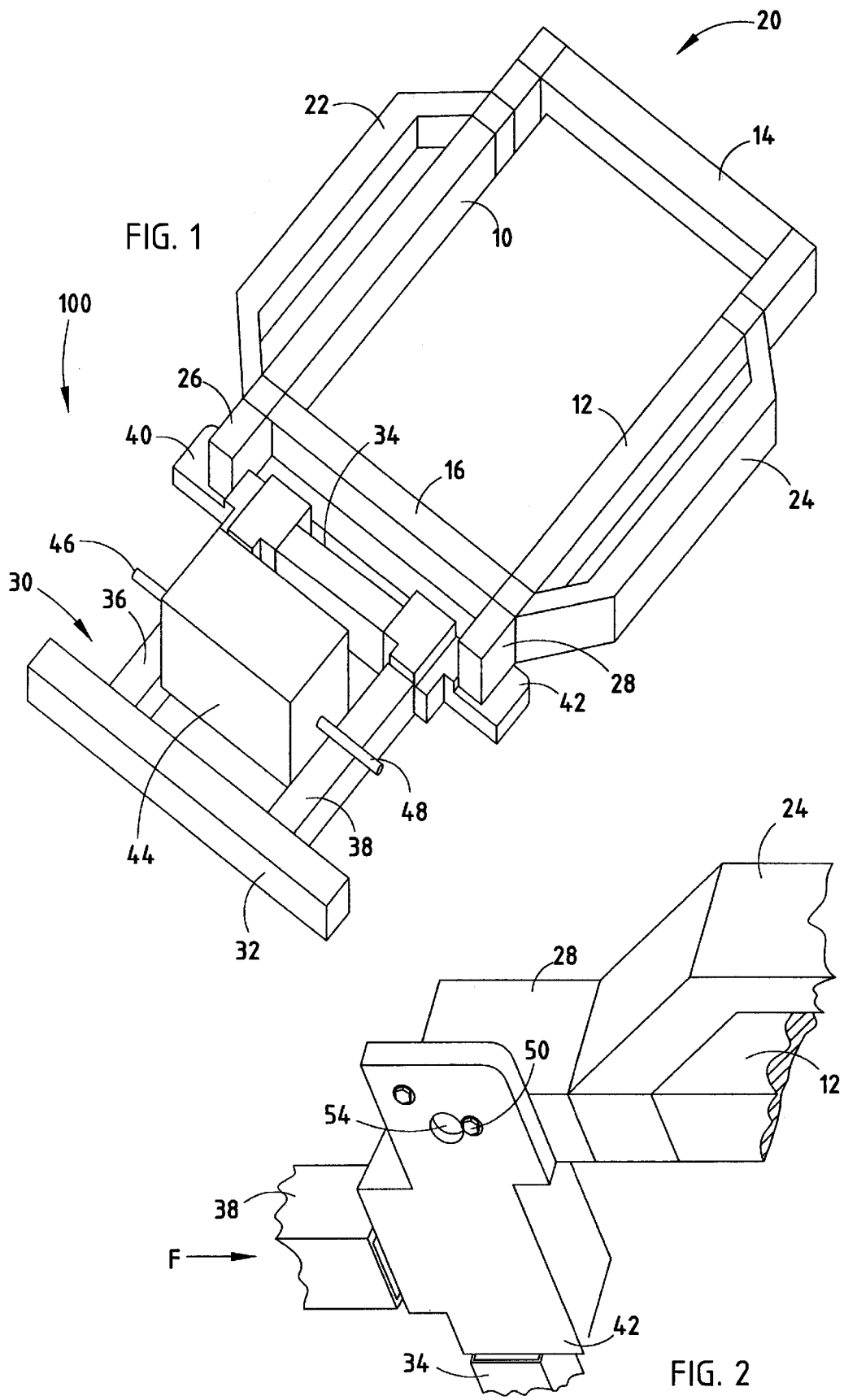

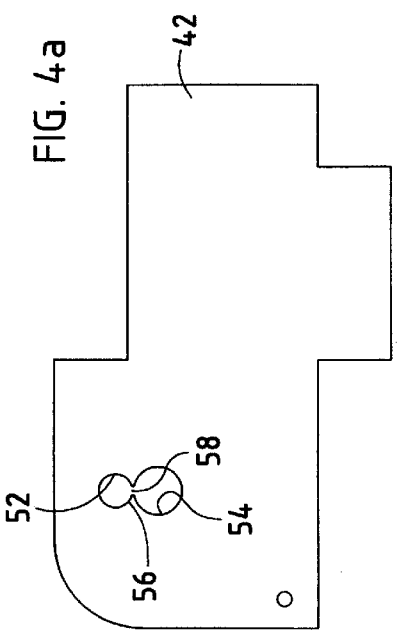
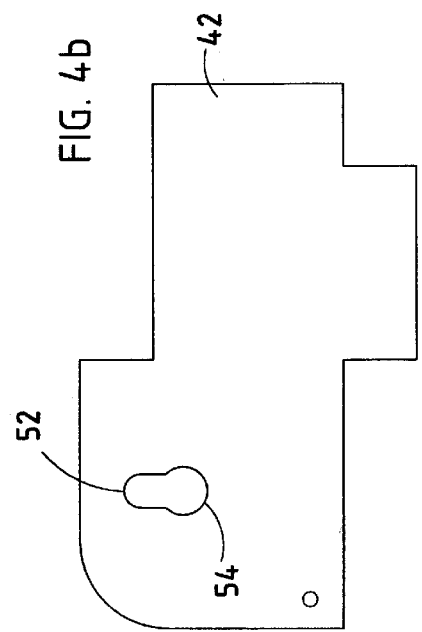
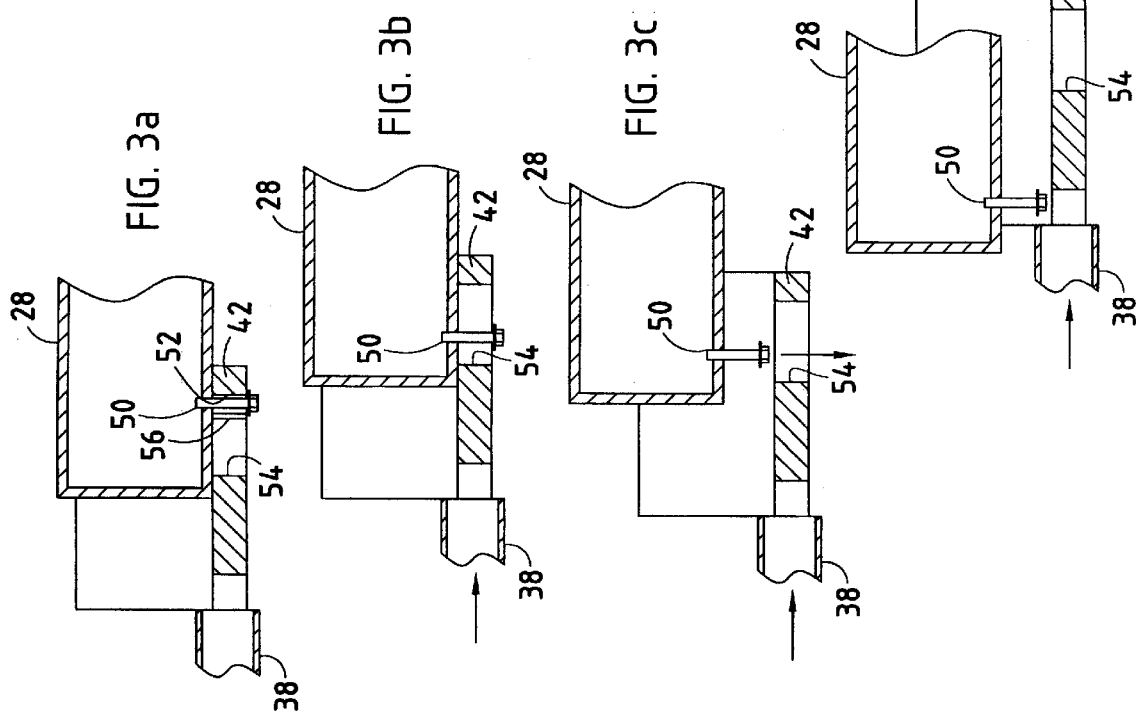

ENERGY MANAGEMENT SYSTEM AND METHOD FOR AN EXTRUDED ALUMINUM VEHICLE SUBFRAME

FIELD OF THE INVENTION

This invention relates to an energy management system and method for absorbing and directing kinetic energy during an impact event of a motor vehicle. More particularly, the present invention relates to a deformable aluminum attachment bracket for attaching an extruded vehicle subframe to a vehicle chassis, where the attachment bracket is purposely deformed upon experiencing an impact load above a predetermined level, allowing the subframe to drop down and below the vehicle chassis during an impact event.

DESCRIPTION OF THE RELATED ART

The controlled management of kinetic energy remains a primary consideration in the design of motor vehicle structures to reduce the likelihood and severity of injury to vehicle occupants in the event of a collision. An aspect of such management is to minimize the effect of the so-called "secondary collision" that occurs between a vehicle occupant and the vehicle interior when the vehicle's occupant compartment is suddenly de-accelerated relative to the occupant. Another aspect is the reduction of intrusions of vehicle components and structures, such as the engine and transmission, into the occupant compartment during the impact event. While significant advances have been made in this regard, including two and three-point seat belt systems, instrument panel padding and knee bolsters, airbags, energy absorbing steering columns, non-invasive brake and accelerator pedals, reinforced occupant compartment structures, and energy absorbing deformable body panels and frames, efforts continue to further improve the state of the art in vehicle occupant restraint and protection.

One example of an energy absorbing structure is found in U.S. Pat. No. 3,171,669, where intermediate connecting members are inserted between the longitudinal bearer members of the vehicle and an impact-protective device, for instance, a bumper, at the vehicle front and rear. The structure disclosed therein exhibits a resistance against impact decreasing in the direction from the wheel axes toward the vehicle rear or front for reducing the impact forces transmitted to the frame or main central vehicle frame structure. Impact resistance is partially obtained through breakable bolts securing the vehicle grill to the vehicle structure. In U.S. Pat. No. 6,022,057, energy absorption is obtained by fixing a construction, such as a front brush bar, to the front of a vehicle, where the construction absorbs energy during a collision. The construction is disclosed as being attached to the vehicle via coupling elements having a weakened (i.e., buckled) portion that is deformable. However, in neither design is there provision for minimizing component stackup, while also maximizing dynamic crash performance during the initial crash event while also reducing component intrusion into the occupant compartment.

Moreover, traditional subframe bolt shearing as an energy absorbing structure has been found impractical in certain applications, particularly with the trend toward lightweight vehicle structural materials, such as aluminum. An example of such an application is found in U.S. Pat. No. 5,085,485, where vehicle body structures are formed by extruded sections manufactured of aluminum. Relatively high-energy absorption is obtained by the use of a member having a central tube portion and two outer hollow-sections connected to the tube portions. But the use of shearing steel bolts in such application is nearly impossible when used in conjunction with relatively softer and less stiff structures, such as aluminum, that are becoming more and more prevalent in vehicle structures. For example, a pair of M12 PC 8.8/10.9 bolts, having a nominal axial ultimate strength of 31,000/40,000 lbs. of force, requires a shearing load of about 23,000/30,000 lbs., applying a 1.3 shear factor. However, such a load will collapse the typical overall aluminum structural assembly prior to any shearing of the bolts. Thus, where the longitudinal load members are manufactured from aluminum to carry and transfer load to the main vehicle support structure, the shear load level obtained with traditional shear bolts as used with steel structures is simply too high to render shearing of the bolts feasible.

SUMMARY OF THE INVENTION

According to the present invention, an energy management system and method for absorbing and directing vehicle kinetic energy during a frontal impact event of a motor vehicle includes an extruded vehicle subframe extending longitudinally from a vehicle chassis, where a pair of deformable attachment brackets are interposed between the vehicle chassis and subframe along each lateral side of the vehicle. The deformable attachment brackets, preferably fabricated from aluminum, attach the subframe to the vehicle chassis, where the deformable attachment brackets are preferably fixedly attached to the subframe and removably attached to the vehicle chassis via fasteners extending through a fastener hole in each of the attachment brackets.

A relief opening is provided proximate to and aligned with the fastener hole, the size of the relief opening being larger than the outer diameter of the fastener. A deformable barrier is disposed between the fastener hole and relief opening, with the barrier preferably provided with a slot extending between the fastener hole and relief opening. The subframe is formed from a set of interconnected extruded rails having a front cross-member and a forwardly extending front rail attached to a transverse beam, wherein each of the front cross-members and forwardly extending front rails are fixedly attached to the deformable attachment bracket.

Upon a vehicle impact generating an impact force on the transverse beam above a predetermined force, the fastener deforms the deformable barrier and is displaced longitudinally from the fastener hole into the relief opening. The deformable attachment bracket, and the attached subframe, drop down beneath the vehicle chassis during the impact event, with the subframe then free to translate longitudinally relative the vehicle chassis during the crash event, safely away from the vehicle occupant compartment.

The above brief description sets forth rather broadly the more important features of the present disclosure so that the detailed description that follows may be better understood and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the following description or drawings. The energy management system and method for absorbing and directing vehicle kinetic energy during a frontal impact event of a motor vehicle of the present disclosure is capable of other embodiments and of being practiced and carried out in various ways. Also, it is to be understood that the phraseology and terminology employed herein are for description and not limitation. Where specific dimensional material specifications have been included or omitted from the specification of the claims, or both, it is to be understood that the same are not to be incorporated into the appended claims.

As such, those skilled in the art will appreciate the conception, upon which this disclosure is based, may readily be used as a basis for designing other structures, methods and systems for carrying out the purposes of the present invention. It is important therefore that the claims are regarded as including such equivalent instructions as far as they do not depart from the spirit and scope of the present invention.

Further, the purpose of the Abstract is to enable the U.S. Patent and Trademark Office and the public generally, especially the scientists, engineers and practitioners in the art who are not familiar with the patent or legal phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other features, advantages and objects of the present invention will be further understood and appreciated by those skilled in the art by reference to the following specification, claims and appended drawings.

BRIEF DESCRIPTION OF THE DRAWINGS

The disclosure of the energy management system and method for absorbing and directing vehicle kinetic energy during a frontal impact event of a motor vehicle is explained with illustrative embodiments shown in the accompanying drawings, where:

FIG. 1 is a perspective view of a chassis of a motor vehicle equipped with the energy management system according to the present invention;

FIG. 2 is a perspective view from beneath the vehicle of the deformable aluminum attachment bracket for attaching an extruded vehicle subframe to a vehicle chassis according to the present invention;

FIG. 3a is a side view of the deformable aluminum attachment bracket of the energy management system according to the present invention before an impact;

FIG. 3b is a side view of the deformable aluminum attachment bracket of the energy management system according to the present invention after an impact, where the deformable barrier has been deformed;

FIG. 3c is a side view of the deformable aluminum attachment bracket of the energy management system according to the present invention after the impact, where the bracket has fallen from the chassis;

FIG. 3d is a side view of the deformable aluminum attachment bracket of the energy management system according to the present invention after the impact, where the bracket has fallen from and moved rearwardly relative to and beneath the chassis;

FIG. 4a is a plan bottom view of the deformable aluminum attachment bracket of the energy management system according to the present invention before an impact; and FIG. 4b is a plan bottom view of the deformable aluminum attachment bracket of the energy management system according to the present invention after an impact.

DETAILED DESCRIPTION OF PREFERRED EMBODIMENT

The best mode for carrying out the invention is presented in terms of the preferred embodiment wherein similar reference characters designate corresponding features throughout the figures of the drawings. Referring now to the drawings, particularly FIG. 1, there is shown the energy management system for absorbing and directing vehicle kinetic energy during an impact event of a motor vehicle according to the present invention, represented by front body structure 100. A main vehicle support structure is conceptually shown as formed by right and left longitudinal members 10 and 12 connected by rear and front transverse members 14 and 16 to form a basic chassis or frame 20. As used herein, "chassis" is intended to refer to any main vehicle support structure to which body components and structures may be attached, such as a traditional vehicle frame formed from parallel and interconnected rails, as well as any integral body structure that may be used to support drivetrain, steering and suspension components, for example, as in a so-called unibody construction. Preferably, side rail members 22 and 24 are included to strengthen the chassis 20 and improve side impact performance. The chassis 20 also includes longitudinal brackets 26 and 28 to which the vehicle subframe 30 may be attached, as discussed below. Preferably, the chassis 20 is fabricated from automotive grade aluminum in order to lower the overall vehicle mass.

The subframe 30 (also referred to as the engine cradle) is preferably formed from extruded aluminum members to form the distal forward end of the vehicle. The subframe 30 includes a transverse beam 32 and a set of interconnected extruded rails including a rear cross-member 34 and a pair of forwardly extending front rails 36 and 38 attached to the transverse beam 32. For further rigidity, a front cross-member (not shown) can be attached to each forward end of the front rails, to which the transverse beam 32 may be attached. One end of the rear cross-member 34 and the right side forwardly extending front rail 36 is fixedly attached, preferably by MIG welding as shown, to a right side deformable attachment bracket 40, while the other end of the rear cross-member 34 and the left side forwardly extending front rail 38 is fixedly attached to a left side deformable attachment bracket 42, as shown. Located within and attached to the subframe 30 is preferably a motor 44 having drive shafts 46 and 48 extending therefrom, as is known.

The subframe 30 is preferably attached to machined aluminum longitudinal brackets 26 and 28 of the chassis 20 through a pair of cast deformable attachment brackets 40 and 42 interposed between the vehicle chassis 20 and the subframe 30. Left side deformable attachment bracket 42 as shown in FIG. 1 is shown from below in greater detail in FIG. 2. Since both right and left side deformable attachment brackets 40 and 42 are identical, only left side deformable attachment bracket 42 will be discussed, it being appreciated that those skilled in the art will understand that corresponding structures and features will be found on the right side deformable attachment bracket 40.

The left side deformable attachment bracket 42 as shown is fixedly attached, preferably by MIG welded, to the rail 38 of subframe 30 and removably attached to the longitudinal bracket 28 of the chassis 20 via a fastener 50 extending through a fastener hole 52 in the deformable attachment bracket 42. The fastener hole 52 has an inner diameter less than the head of the outer diameter of the fastener 50 (preferably a M12 PC 8.8 bolt), and, as best shown in FIGS. 2 and 3a, attaches the attachment bracket 42 to and beneath the vehicle chassis 20. A relief opening 54 extends through the left side deformable attachment bracket 42 and is disposed proximate the fastener 50, such that the relief opening 54 is aligned with the fastener hole 52 substantially in the direction of a frontal impact. As best shown in FIGS. 2 and 4a, the size of the relief opening 54 is preferably larger than the outer diameter of the fastener 50, such that the fastener 50 may pass readily through the relief opening 54. A deformable barrier 56 is disposed between the fastener hole 52 and the relief opening 54. Preferably, the deformable barrier 56 includes a slot 58 that extends between the fastener hole 52 and the relief opening 54, as shown in FIG. 4a.

In operation, upon a vehicle impact, a force is generated upon a bumper beam (not shown). The bumper beam, preferably an extruded double cell bumper, collapses first. The front rails (not shown) then are designed to crush axially (or longitudinally) in a stable and controlled mode, absorbing kinetic energy, and the forces are transferred rearwardly through the vehicle structure. During the impact event, the impact forces developed are transmitted to and through the subframe 30. These forces are then directed to the rear subframe connections with the longitudinal brackets 26 and 28 of the chassis 20 through the deformable attachment brackets 40 and 42. The longitudinal brackets 26 and 28 of the chassis 20, in turn, apply and focus the impact force F, shown in FIG. 2, through the fastener 50 onto the deformable barrier 56. The deformable attachment bracket 42 is thus urged to move rearward relative to the longitudinal bracket 28, overcoming the clamping load generated by the fastener 50. The deformable barrier 56 in turn is entirely deformed and, in view of the preferred very short slot 58, essentially obliterated to allow the fastener 50 to translate from the fastener hole 52 to the relief opening 54, as best shown in FIGS. 3b and 4b. Since the relief opening 54 is significantly larger than the outer diameter of the fastener 50, the fastener 50 will be allowed to slide through the relief opening 54, effectively detaching the attachment brackets 40 and 42 and the subframe 30 from the chassis 20 and causing the subframe 30 to drop harmlessly under the chassis 20, as shown in FIG. 3c. As further shown in FIG. 3d, the subframe 30 is further urged rearwardly and translates longitudinally relative the chassis 20 during the crash event.

This mechanism thus allows the aluminum subframe 30 to drop down during a 30–35 m.p.h. full frontal crash. The benefits to such a function include minimizing stackup, in that additional energy absorbing structures can be incorporated but then directed away from the occupant compartment when spent, maximizing dynamic crash response, reducing intrusion into the occupant compartment, and overall enhancing the deceleration-time response beyond the first 30 milli-seconds of the crash event. Moreover, by modifying the size and shape of the deformable barrier 56 and slot 58, only an impact force above a predetermined force may be selected to displace the fastener 50 from the fastener hole 52 longitudinally into the relief opening 54.

It should be noted that although the preferred application of present invention is for attachment of the subframe 30 to the chassis 20 at the forward distal end of the vehicle, the invention could advantageously be employed at the rear distal end of the vehicle. Thus, in the event of a rear impact, for example at a stop light, the benefits of energy absorption and redirection of vehicle structures away from and beneath the occupant compartment can be realized.

The drawbacks of the prior art have thus been overcome in an economical, practical and facile matter. While the preferred embodiment and example configuration has been shown and described, it is understood that various modifications and additional configurations would be apparent to those skilled in the art. It is intended that the specific embodiments and configurations disclosed are illustrative of the preferred and best modes for practicing the invention and should not be interpreted as limitations on the scope of the invention, as defined by the appended claims, and is to be appreciated that various changes, rearrangements and modifications may be made therein without departing from the scope of the invention as defined by the appended claims as interpreted according to the principles of patent law, including the doctrine of equivalents.

We claim:

1. An energy management system for absorbing and directing kinetic energy during an impact of a vehicle, the vehicle having a main support structure and a distal support structure extending longitudinally therefrom, the energy management system comprising:

a deformable attachment bracket interposed between said main support structure and said distal support structure and attaching said main support structure to said distal support structure, the deformable attachment bracket being fixedly attached to a first one of said main support structure and said distal support structure, a fastener hole extending through said deformable attachment bracket for receiving a fastener, said fastener attaching said bracket to and beneath the other one of said main support structure and said distal support structure, a deformable barrier disposed proximate said fastener hole, said fastener deforming said deformable barrier upon said impact of said vehicle generating an impact force greater than a predetermined force to release said fastener from said fastener hole and to translate the distal support structure longitudinally relative said main support structure, and a relief hole proximate said deformable barrier, such that said deformable barrier is between said fastener hole and said relief hole, said fastener having an outer diameter and said relief hole having a diameter larger than the outer diameter of said fastener, whereby upon said impact said relief hole translates longitudinally relative said fastener such that said fastener is displaced from said fastener hole longitudinally into said relief hole and said distal support structure drops below and translates longitudinally relative said main support structure.

2. The energy management system of claim 1, further comprising a pair of said deformable attachment brackets disposed on opposite sides of the vehicle, wherein said impact force is directed by said deformable attachment brackets along a direction substantially aligned with said fastener hole, said deformable barrier and said relief hole.

3. The energy management system of claim 1, wherein said deformable attachment bracket is fabricated from aluminum.

4. The energy management system of claim 3, wherein said main support structure is an extruded vehicle subframe.

5. The energy management system of claim 1, wherein said deformable attachment bracket is fixedly attached to said distal support structure and removably attached to said main support structure.

6. The energy management system of claim 5, wherein said deformable attachment bracket is welded to said distal support structure and removably attached to said main support structure via said fastener.

7. The energy management system of claim 1, wherein said deformable barrier further comprises a slot extending between said fastener hole and said relief hole.

8. The energy management system of claim 1, wherein said distal support structure is an extruded vehicle subframe fixedly attached to said deformable attachment bracket and wherein said fastener drops from said deformable attachment bracket upon said impact force, said subframe dropping and translating beneath said main support structure during said impact.

9. A front body structure for a motor vehicle in which an extruded vehicle subframe extends longitudinally from a vehicle chassis and a deformable attachment bracket is interposed between said vehicle chassis and said subframe, said deformable attachment bracket attaching said vehicle chassis to said subframe, the deformable attachment bracket being fixedly attached to said subframe and removably attached to said vehicle chassis via a fastener, a fastener hole extending through said deformable attachment bracket for receiving said fastener, said fastener having an outer diameter and attaching said bracket to and beneath said vehicle chassis, a relief opening extending through said deformable attachment bracket and disposed proximate said fastener, said relief opening being aligned with said fastener hole and said relief opening being larger than said outer diameter of said fastener, and a deformable barrier disposed between said fastener hole and said relief opening, wherein said fastener deforms said deformable barrier upon a vehicle impact generating an impact force greater than a predetermined force to displace said relief opening and said fastener hole longitudinally relative said fastener, such that said fastener is displaced from said fastener hole longitudinally into said relief opening through which said fastener drops, said subframe dropping down beneath said vehicle chassis during said vehicle impact and said subframe translating longitudinally relative said vehicle chassis during said vehicle impact.

10. The front body structure for said motor vehicle of claim 9, further comprising a transverse beam and wherein said subframe comprises a set of interconnected extruded rails having a rear cross-member and a forwardly extending front rail attached to said transverse beam, wherein each of said rear cross-member and said forwardly extending front rail are fixedly attached to said deformable attachment bracket.

11. The front body structure for said motor vehicle of claim 10, wherein said subframe is detachably attached to a pair of longitudinal body rails extending from said vehicle chassis through a pair of said deformable attachment brackets.

12. The front body structure for said motor vehicle of claim 9, wherein said deformable barrier further comprises a slot extending between said fastener hole and said relief opening.

13. The front body structure for said motor vehicle of claim 9, wherein said deformable bracket is fabricated from aluminum.

14. A method for absorbing and directing kinetic energy during an impact of a vehicle having a vehicle body support structure and a subframe assembly extending longitudinally therefrom, the method comprising the steps of:

interposing a pair of deformable attachment brackets between said vehicle body support structure and said subframe assembly and attaching said vehicle body structure to said subframe assembly through said pair of deformable attachment brackets, said pair of deformable attachment brackets having a relief opening and being fixedly attached to said subframe assembly and detachably attached to said vehicle body support structure, fastening a fastener through each of said pair of deformable attachment brackets, said fastener having an outer diameter and attaching said bracket to and beneath said vehicle body support structure, deforming a deformable barrier disposed adjacent said fastener and said relief opening upon said impact of said vehicle generating an impact force greater than a predetermined force to displace said relief opening longitudinally relative said fastener, and releasing said fastener, dropping said subframe assembly relative said vehicle body support structure and longitudinally translating said subframe assembly relative said vehicle body support structure upon an impact load above a predetermined force.

15. The method of claim 14, wherein said pair of deformable attachment brackets are welded to said subframe assembly and removably attached to said vehicle body support structure via said fastener.

16. The method of claim 14, wherein said deformable barrier further comprises a slot extending therethrough.

17. The method of claim 14, wherein said deformable bracket is fabricated from aluminum.

* * * * *